United States Patent
Strandberg et al.

(10) Patent No.: US 8,037,979 B2
(45) Date of Patent: Oct. 18, 2011

(54) ARRANGEMENT FOR REDUCING A ROTATIONAL SPEED OF A ROTATING MEMBER

(75) Inventors: Jonny Strandberg, Eskilstuna (SE); Thomas Andersson, Eskilstuna (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 565 days.

(21) Appl. No.: 11/719,330

(22) PCT Filed: Dec. 14, 2004

(86) PCT No.: PCT/SE2004/001901
§ 371 (c)(1),
(2), (4) Date: May 15, 2007

(87) PCT Pub. No.: WO2006/065178
PCT Pub. Date: Jun. 22, 2006

(65) Prior Publication Data
US 2009/0071765 A1      Mar. 19, 2009

(51) Int. Cl.
*F16D 65/54* (2006.01)
*F16D 65/00* (2006.01)

(52) U.S. Cl. ............... 188/196 P; 188/71.8; 192/70.252

(58) Field of Classification Search ............ 188/1.11 R, 188/1.11 W, 196 R, 196 P, 71.7, 71.8, 73.1; 192/70.251, 70.252
See application file for complete search history.

(56) References Cited

U.S. PATENT DOCUMENTS

| | | | |
|---|---|---|---|
| 3,085,663 A | | 4/1963 | Jakeways |
| 3,403,754 A | * | 10/1968 | Barrett et al. ............... 188/71.5 |
| 3,403,755 A | * | 10/1968 | Barrett et al. ............... 188/71.5 |
| 3,532,190 A | | 10/1970 | Palmer |
| 3,613,849 A | * | 10/1971 | Pape ............................ 192/90 |
| 3,618,714 A | * | 11/1971 | Croswell ..................... 188/71.8 |
| 4,345,674 A | * | 8/1982 | Vacval ........................ 188/71.8 |
| 5,697,472 A | * | 12/1997 | Walker et al. ........... 188/1.11 W |
| 2002/0157905 A1 | * | 10/2002 | Bendtsen et al. ........... 188/71.8 |
| 2003/0037998 A1 | | 2/2003 | Bendtsen et al. |

OTHER PUBLICATIONS

International Search Report for corresponding International Application PCT/SE2004/001901.

* cited by examiner

*Primary Examiner* — Melody M Burch
(74) *Attorney, Agent, or Firm* — WRB-IP LLP

(57) ABSTRACT

An arrangement for reducing a rotational speed of a rotating member includes a first and second pressure member arranged at a distance from each other and an opposite sides of the rotating member for movement relative to each other between a retracted position and a forward position engaging the rotating member. The arrangement includes an adjustment device including a friction structure forming a friction joint with one of the pressure members for maintaining a position relative to one another provided a maximum friction force is not exceeded. The arrangement further includes a spring acting on the friction structure for separating the pressure members after having been compressed. The spring has a gradually increasing spring force between a non-compressed state and a totally compressed state. An intermediate spring force value of the spring, which corresponds to compression of the spring to an extent less than the totally compressed state, equals a maximum friction force of the friction joint so that the friction structure is forced to move relative to the pressure member, with which it forms the friction joint, when the maximum friction force is exceeded.

19 Claims, 4 Drawing Sheets

ARRANGEMENT FOR REDUCING A ROTATIONAL SPEED OF A ROTATING MEMBER

BACKGROUND AND SUMMARY

The present invention relates to an arrangement for reducing a rotational speed of a rotating member. The arrangement comprises a first and second pressure member arranged at a distance from each other and on opposite sides of the rotating member. The first and second member are movable relative to each other between a retracted position and a forward position engaging the rotating member. The invention is particularly suitable for application in a hydraulic disc brake in which the pressure members are pressed against opposite faces of a brake disc to provide frictional resistance to its rotation.

The arrangement comprises an adjustment device comprising a friction means forming a friction joint with one of said pressure members for maintaining a position relative to one another provided a maximum friction force is not exceeded. The arrangement further comprises a spring means acting on the friction means for separating the pressure members after having been compressed. The spring means has a gradually increasing spring force between a non-compressed state and a totally compressed state.

The invention will below, in a non-limiting example, be explained for a brake. The first pressure member forms a brake piston. The friction means forms the friction joint with the piston. The second pressure member forms a stationary member forming a mechanical stop. During each application of the brake, the piston moves forwardly, the friction means moving with it, until the opposite faces of the brake piston and the stationary member are in frictional engagement with the brake disc. The spring means is compressed during this movement. When the brake piston is released from brake pressure, it is urged away from the face of the brake disc by the spring means acting on the friction means. An automated return function is thereby achieved. Further, the piston is movable to a displaced position relative to the friction means when a maximum friction force of the friction joint is exceeded. In this way, the clearance is maintained substantially constant despite wear.

In U.S. Pat. No. 3,085,663, an automatic adjustment device for a brake is disclosed. The device is arranged in a recess in a brake piston. The friction means is formed by a close-coiled helical spring in frictional engagement with the peripheral wall of the recess. The spring means is formed by a dished disc-type washer arranged beside the helical spring. During each application of the brake, the disc-type spring washer is compressed to a flat condition. One disadvantage with this arrangement is that the spring effect of the washer will be deteriorated, due to cracks etc, after a number of brake applications.

It is desirable to achieve an arrangement for reducing a rotational speed of a rotating member with a longer life in relation to earlier known designs. It is also desirable to achieve a compact design minimizing the number of articles necessary.

According to an aspect of the present invention, an intermediate spring force value of the spring means, which corresponds to compression of the spring means to an extent less than said totally compressed state, equals a maximum friction force of the friction joint so that the friction means is forced to move relative to the pressure member, with which it forms the friction joint, when said maximum friction force is exceeded. Thus, the spring force of the spring means is balanced to the friction force of the friction joint.

Due to the fact that the spring means will not, at any time, be compressed to the totally compressed state, it will not be subjected to as large loads as prior art devices and thus have a longer life. Further, the automatic return function and constant clearance is achieved in one single apparatus, which creates conditions for a cost-efficient production and installation. More specifically, the adjustment device may be pre-mounted.

According to a preferred embodiment, the friction means is at least partly arranged in an opening in the pressure part and that an outer surface of the friction means and a peripheral wall of the opening have a complementary design for forming the friction joint. This design creates further conditions for a cost-efficient production and installation. Only one hole is required in one of the pressure members. According to a further development of the embodiment above, the spring means has a smaller outer diameter than the outer diameter of the friction portion. In this way, the first pressure part may be moved to a position where there is an overlap between the first pressure part and the spring means seen in the radial direction.

According to a further preferred embodiment, the spring means comprises a plurality of dished disc-type washers and that at least two of the washers extend in different directions. By virtue of this design, a sufficient spring effect is achieved in a space-efficient way.

According to a further preferred embodiment, the adjustment device comprises an elongate support portion and the friction means is arranged for movement relative to the support portion in its longitudinal direction. This creates conditions for a compact and cost-efficient design.

Further preferred embodiments and advantages will be apparent from the following description.

BRIEF DESCRIPTION OF THE DRAWINGS

The invention will be explained below, with reference to the embodiments shown on the appended drawings, wherein.

DETAILED DESCRIPTION

Figure 1:
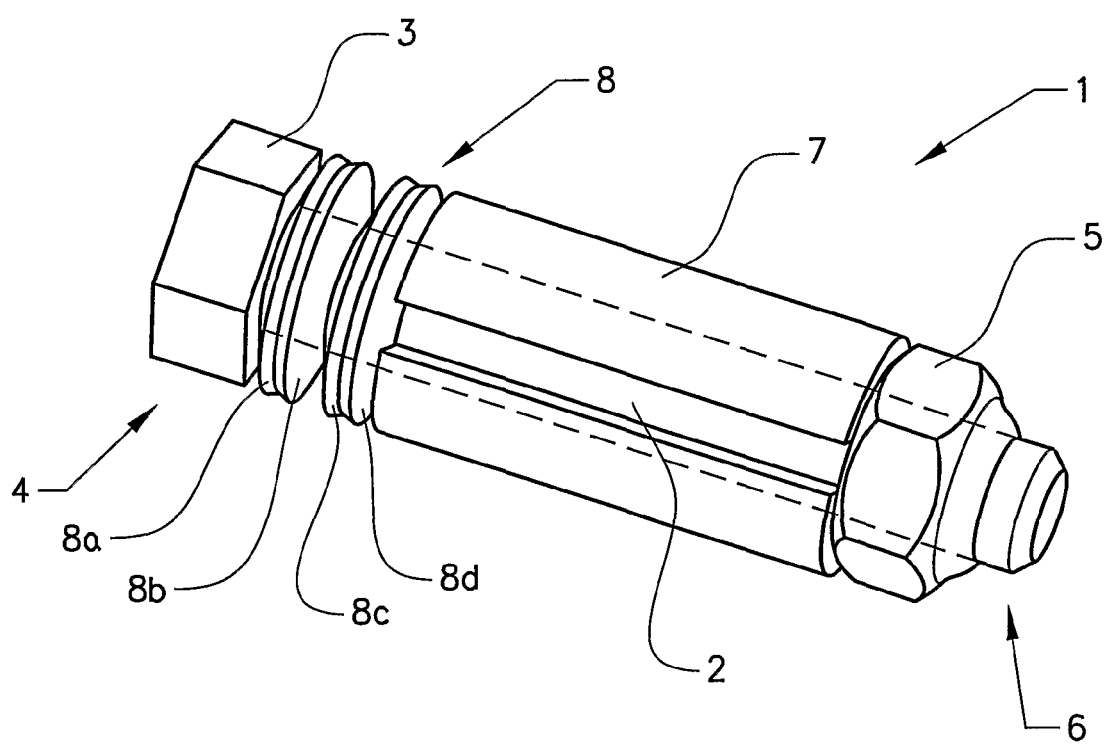
FIG. 1 illustrates a first embodiment of an adjustment device in a perspective view.

FIG. 1 illustrates a first embodiment of an adjustment device 1 suitable for a hydraulic brake in a perspective view. The adjustment device 1 comprises an elongated support portion 2, or pin, in the form of a bolt shank. A first end portion 3, in the form of a bolt head, is fixed at a first end 4 of the support portion 2, forming a one-piece unit. A second end portion 5, in the form of a hex nut, is fixed at a second end 6 of the support portion 2. The support portion 2, the first end portion 3 and the second end portion 5 will below be referred to as bolt shank, bolt head and nut for ease of presentation.

A friction means 7 in the form of a split tubular member, or sleeve, is arranged co-axially around the bolt shank 2. The friction means 7 is freely movable relative to the bolt shank 2 in its longitudinal direction. A spring means 8 is arranged around the bolt shank 2 beside the tubular friction means 7.

The spring means 8 comprises a plurality of hollow, dished disctype washers 8a, 8b, 8c, 8d.

Four disc-type washers 8a, 8b, 8c, 8d are arranged side by side in an oblique manner. Thus, each washer 8a, 8b, 8c, 8d is inclined in relation to a radial direction of the bolt shank 2. A first pair of washers 8a, 8b to the left are inclined towards each other in such a way that the radial inner parts of the washers are located at a distance from each other in the longitudinal direction of the bolt shaft 2 and the radial outer parts of the washers 8a, 8b contact each other, see also FIG. 2. A second pair of washers 8c, 8d to the right are arranged in the same way. The friction means 7 and the spring means 8 will below be referred to as split sleeve and disc-type washers for ease of presentation.

The bolt head 3 projects in a direction across a longitudinal direction of the bolt shank 2 forming a flat shoulder (pressure surface) facing the disc-type washers 8. The nut 5 projects in a direction across the longitudinal direction of the bolt shank 2 forming a flat shoulder (pressure surface) facing the split sleeve 7. Thus, one side of the set of disc-type washers 8 contacts the bolt head 3 and the other side of the set of disc-type washers 8 abuts a close end of the split sleeve 7. A remote end of the split sleeve 7 abuts the nut 5.

Figure 2:
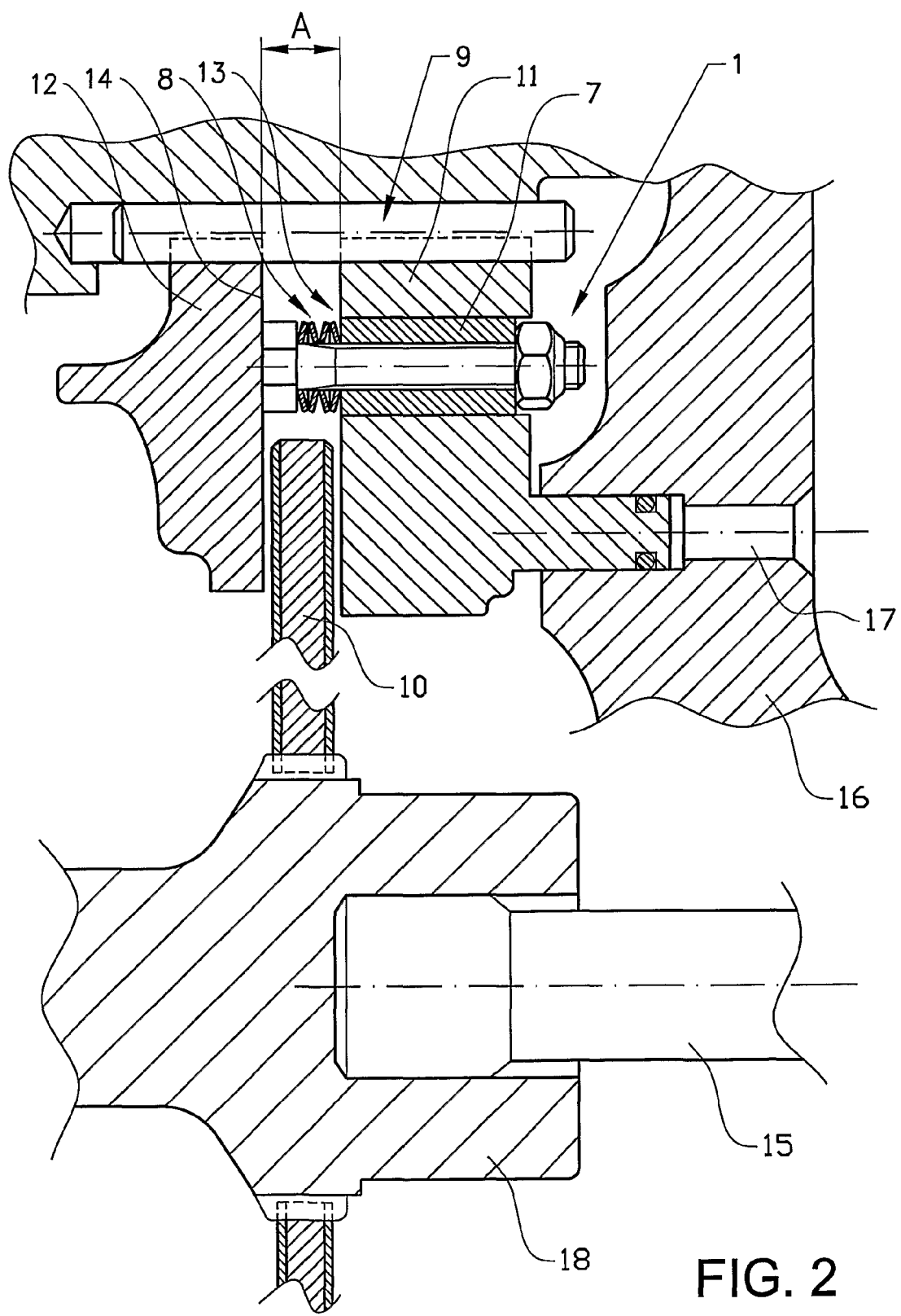
FIG. 2 illustrates a first embodiment of an arrangement for reducing a rotational speed of a disc, comprising the adjustment device according to FIG. 1, in a cut view.

FIG. 2 illustrates the adjustment device 1 according to FIG. 1 arranged in a brake arrangement 9 according to a first embodiment. The brake 9 is arranged for braking the rotation of a drive shaft 15. More specifically, the brake 9 is a wet brake comprising one single brake disc 10. The brake disc 10 is mounted to the drive shaft 15 via an intermediate connecting piece 18 and extends radially therefrom. The brake 9 comprises a first annular pressure member 11 in the form of a pressure fluid operated disc brake actuating means, or hydraulic braking piston.

The brake 9 comprises a second pressure member 12 in the form of a stationary brake housing piece. The brake disc 10 has first and second sides facing the piston 11 and the stationary housing piece 12. The piston 11 and the stationary piece 12 are arranged at a distance from each other and on opposite sides of the disc 10.

The piston 11 is slidably arranged in a further brake housing part 16 for movement between a retracted position, substantially not effecting the rotational speed of the disc 10 and a forward position engaging the disc 10 and effecting the rotational speed of the disc. A conduit 17 is provided through the brake housing part 16 for supplying hydraulic fluid to the piston 11.

The piston 11 is provided with an engagement surface opposite the first side of the disc 10. Pressurized hydraulic fluid drives the piston 11 forwardly so that the engagement face of the piston engages the first side of the brake disc 10 compressing it against the stationary piece 12.

The piston 11 is provided with an opening 13, or aperture facing the pressure surface of the stationary piece 12. More specifically, the opening 13 forms a through hole with a circular cross sectional shape through the piston 11. The opening 13 extends in parallel with a movement direction of the piston 11.

The adjustment device 1 is partly arranged in the opening 13. The bolt head 3 is arranged in contact with and supported by a pressure surface 14 of the stationary piece 12. Thus, the bolt head 3 is arranged in the gap between the piston 11 and the stationary piece 12. The bolt shaft 2 extends from the bolt head 2 into the opening 13. The split sleeve 7 is in frictional engagement with the peripheral wall of the opening 13 for movement in unison with the piston 11 when it is moved between the retracted and the forward position. More specifically, the split sleeve 7 forms an interference fit with the walls of the opening 13.

In FIG. 2, the brake arrangement 9 is illustrated in a non-compressed state. The brake disc 10 is free from contacting the piston 11 and the stationary piece 12.

Figure 3:
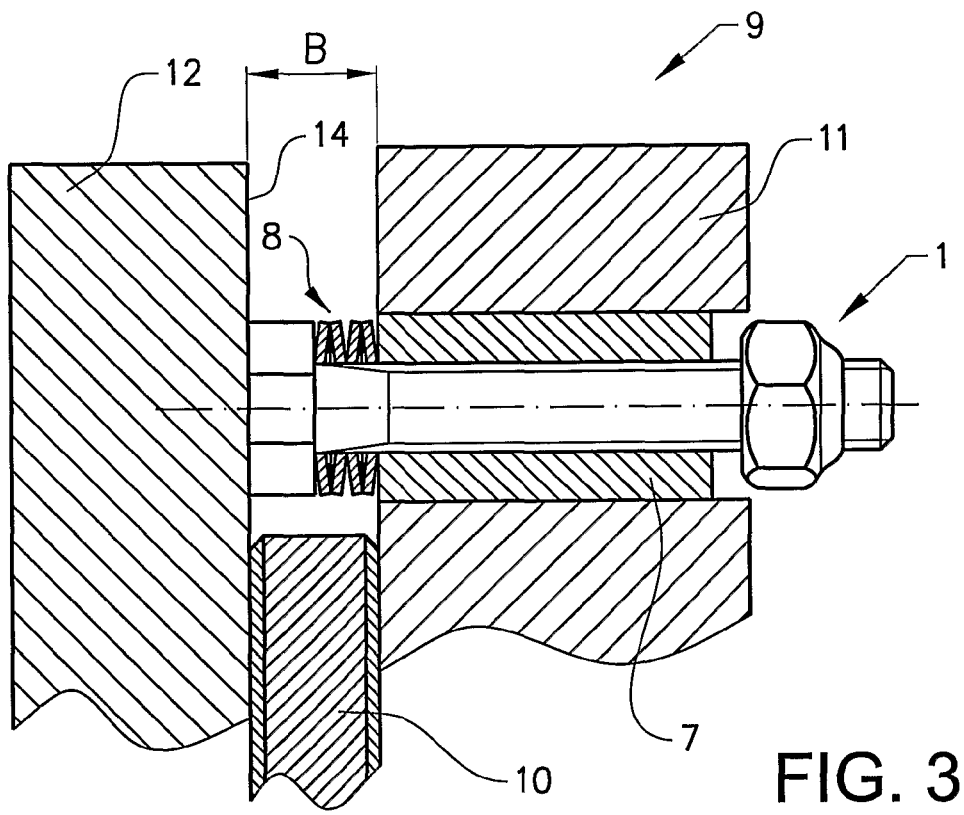
FIG. 3 illustrates the arrangement of FIG. 2 in a compressed state.

In FIG. 3, the brake 9 is illustrated in a compressed state, in which the brake piston 11 is in frictional engagement with the brake disc 10. During each application of the brake 9, the piston 11 moves forwardly, the split sleeve 7 moving with it, until the piston 11 is in frictional engagement with the brake disc 10. The disc-type spring washers 8 are compressed to a certain extent during this movement. More specifically, the disc-type spring washers 8 are compressed to a state between a first, non-compressed state and a second, totally compressed- state during each brake application. The set of disc-type washers 8 has a substantially linearly increasing spring force between the non-compressed state and the totally compressed state. According to the invention, the set of disc-type washers are never compressed to the totally compressed, flat state. Instead, the disc-type washers are only compressed to an intermediate state, suitably a distance between 50-80% of the totally available spring distance of the washers 8. The intermediate spring force value can be in the interval of 30-90% of the maximum spring force, preferably in the interval 60-80% of the maximum spring force.

Upon release of the brake force acting on the piston 11, the disc-type spring washers 8 urge the split sleeve 7 and the piston 11 backwards towards its initial, non-engaging position shown in FIG.2. In this way, the return movement of the piston 11 is constant. The brake release distance is defined as a distance A, see FIG. 2, between the piston 11 and the stationary piece 12 in the non-compressed state minus the distance B, see FIG. 3 between the piston 11 and the stationary piece 12 in the compressed state.

Figure 4:
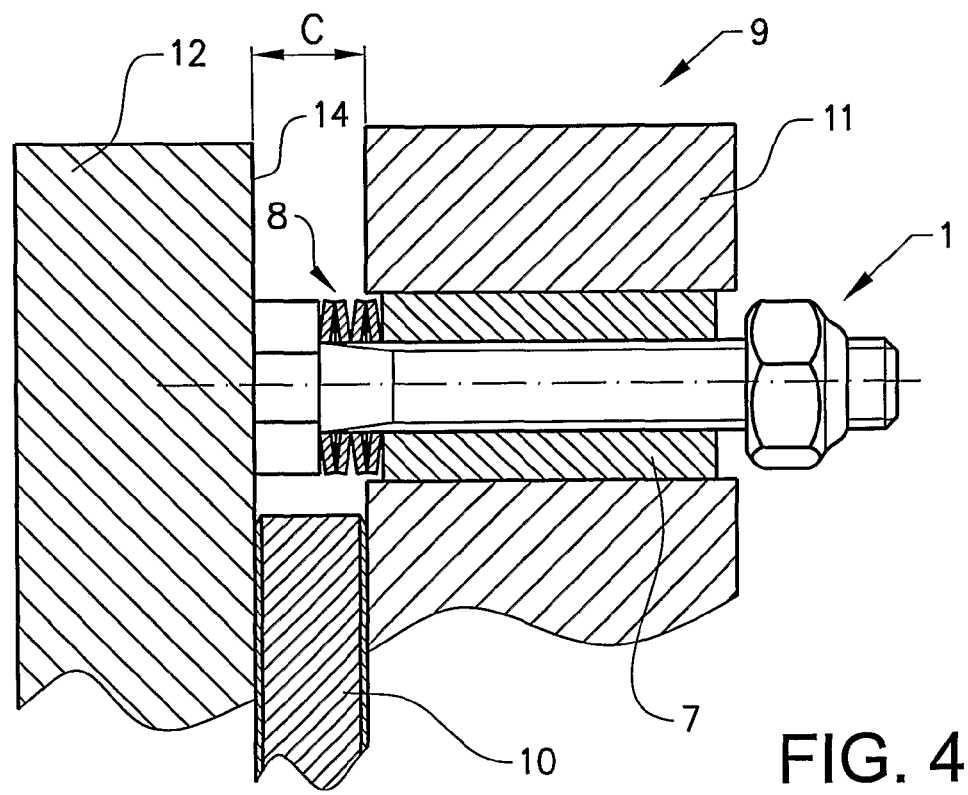
FIG. 4 illustrates the arrangement of FIG. 2 in a compressed state where the brake disc is worn.

If further movement is required to bring the engagement surfaces of the piston 11 and the stationary piece 12 firmly into engagement with the brake disc 10, the piston 11 moves relatively to the split sleeve 7, see FIG. 4. When the brake is subsequently released, the split sleeve 7 and the piston 12 maintain their new, displaced position relative to one another and the disctype washers 8 return the split sleeve 7 and the piston 12 backwards until the washers 8 are released. Thus, the return movement of the piston 11 is constant independent of the mutual positions of the split sleeve 7 and the piston 12.

Thus, as the brake disc 10 wears, the piston 11 will take up new positions closer to the brake disc as it is moved relative to the split sleeve 7. This is illustrated in FIGS. 3 and 4, both illustrating the adjustment device 1 with the spring means 8 in a compressed state. The distance B between the piston 11 and the stationary piece 12 is larger in FIG. 3, in which the brake disc is not worn relative to the distance C between the piston 11 and the stationary piece 12 in FIG. 4, in which the brake disc is worn.

In order to achieve this effect, the contacting friction surfaces of the split sleeve 7 and the piston 11 are designed so that the maximum friction force, before slippage, equals said intermediate spring force less than the maximum spring force corresponding to compression of the disc-type washers 8 to the fully compressed, flat state. Thus, the piston 11 is forced to move towards the brake disc, relative to the split sleeve 7 when said intermediate spring force is exceeded.

Thus, the adjustment device 1 is designed for automatically adjusting the position of the piston 11 and the stationary piece 12 relative to one another so that upon release of a brake force acting on the piston 11 to effect a working stroke, a substantially constant clearance is maintained between the piston 11, the stationary piece 12 and the brake disc 10 actuated thereby.

The adjustment device 1 is further designed for easy installation in the brake 9. The adjustment device 1 is installed in said opening 13 in the brake piston 11 by being forced through said opening 13 from a rear side, opposite the stationary piece 12. The adjustment device is arranged projecting a distance from the piston 11, which projection is somewhat larger than the brake disc thickness plus the clearance. When the brake is first applied after installation, the clearance will be adjusted.

Figure 5:
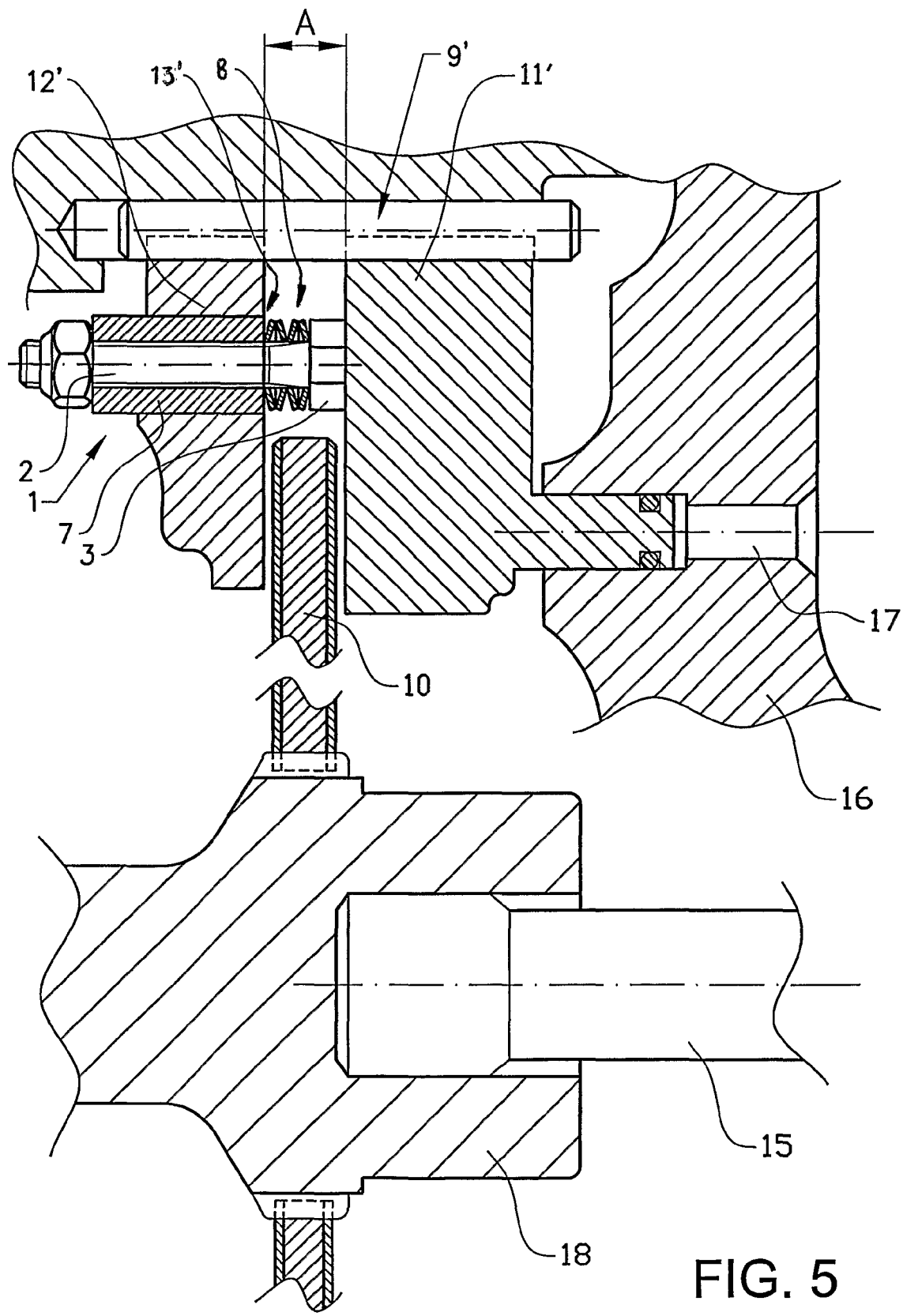
FIG. 5 illustrates a second embodiment of an arrangement for reducing a rotational speed of a disc, comprising the adjustment device according to FIG. 1, in a cut view.

FIG. 5 illustrates the adjustment device 1 according to FIG. 1 arranged in a brake arrangement 9' according to a second embodiment. Only the differences relative to the first embodiment, see FIG. 2, will be described. Same reference numerals refer to the same parts as in FIG. 2. The stationary part 12' is provided with an opening 13' facing the pressure surface of the piston 11'. More specifically, the opening 13' forms a through hole through the stationary part 12'. The opening 13' extends in parallel with a movement direction of the piston 11.

The adjustment device 1 is partly arranged in the opening 13'. The bolt head 3 is arranged in contact with and supported by a pressure surface of the piston 11'. Thus, the bolt head 3 is arranged in the gap between the piston 11' and the stationary piece 12'. The bolt shaft 2 extends from the bolt head 3 into the opening 13'. The split sleeve 7 is in frictional engagement with the peripheral wall of the opening 13'. The piston 11' will urge the bolt head 3 towards the stationary piece 12', compressing the disc-type spring washers 8, when it is moved between the retracted and the forward position. Thus, the bolt shank 2 will move relative to the split sleeve 7 during braking.

Upon release of the brake force acting on the piston 11', the disc-type spring washers 8 urge the bolt head 3 and the piston 11' backwards towards its initial, non-engaging position. In this way, the return movement of the piston 11' is constant.

According to the described embodiment of the adjustment device, the support portion 2 is formed by a bolt shank, the first end portion 3 is formed by a bolt head and the second end portion 5 is formed by a nut fixed on the bolt shank. This design, creates conditions for a cost-efficient adjustment device.

The invention is not in any way limited to the above described embodiment, instead a number of alternatives and modifications are possible without departing from the scope of the following claims.

For example, the friction means may be formed by a close-coiled spring. Further, the shape of the friction means may be distinct from a tubular outer shape. The opening in the first pressure member (piston) may differ from a circular cross sectional shape and may form, for example an elliptical shape. The inner cross sectional shape of the opening may be different from the outer cross sectional shape of the friction means. The important characteristic is the relationship between the shape and the outer dimension of the friction means and the shape and inner dimension of the opening for achieving the friction joint described above.

The spring means may be formed by a different number of disc-type washers than on the exemplified embodiment. Thus, the number of washers may be 1,2,3,5 or more. The number of washers is selected depending on the brake clearance desired. Further, the dished washers may be inclined in relation to each other in different ways than the way shown in the drawings . For example two adjacent washers may be arranged in parallel to each other, i.e. with the same inclination. Further, the washers may be arranged in such a way that a progressive brake force is achieved. This may be achieved by combining washers of different design, material, stiffness and or inclination. Further, a different resilient means than a set of disc-type washers may be used, such as a spring coil.

Further, the elongated support portion may be of a different design than a threaded bolt shank. For example, a pin with a flat outer surface may be used. Consequently, the end portions for the split sleeve and the spring means may be of a different design than the bolt head and nut shown in the drawings. The end portions may be formed by flanges projecting from the pin and rigidly secured at the ends of the pin. The important characteristic is that the end portions limit the axial distance for the spring means and the sleeve.

Further, the number of brake discs in the arrangement may be more than one. However, the arrangement is particularly useful for an arrangement with one or only a few brake discs.

The arrangement described above may be used for a brake arranged at the wheel of a vehicle for braking the rotation of the wheel. The arrangement may also be used for a brake arranged in a different position than at the wheels, such as in a gearbox of the vehicle. The arrangement may also be used for a clutch. The arrangement can advantageously be used in applications where a constant volume of hydraulic fluid is desired for actuating a rotating member.

The invention claimed is:

1. An arrangement for reducing a rotational speed of a rotating member, comprising
a first and second pressure member arranged at a distance from each other and on opposite sides of the rotating member for movement relative to each other between a retracted position and a forward position engaging the rotating member, an adjustment device comprising
a friction means forming a friction joint with one of the pressure members for maintaining a position relative to one another provided a maximum friction force is not exceeded, and
a spring means acting on the friction means for separating the pressure members after having been compressed, the spring means having an increasing spring force between a non-compressed state and a totally compressed state
wherein an intermediate spring force value of the spring means, which corresponds to compression of the spring means to an extent less than the totally compressed state, equals a maximum friction force of the friction joint so that the friction means is forced to move relative to the pressure member, with which it forms the friction joint, due only to compression of the spring means to the intermediate spring force value at which the maximum friction force is exceeded.

2. An arrangement according to claim 1, wherein the friction means is at least partly arranged in an opening in one of the first and second pressure member and an outer surface of the friction means and a peripheral wall of the opening have a complementary design for forming the friction joint.

3. An arrangement according to claim 1, wherein the friction means has a tubular shape.

4. An arrangement according to claim 1, wherein the spring means has a smaller outer diameter than an outer diameter of the friction means.

5. An arrangement according to claim 1, wherein the spring means comprises at least one dished disc washer.

6. An arrangement according to claim 1, wherein the spring means comprises a plurality of dished disc washers and that at least two of the washers extend in different directions.

7. An arrangement according to claim 1, wherein the adjustment device comprises a support portion and the friction means is arranged for movement along the support portion.

8. An arrangement according to claim 7, wherein the support portion has an elongate shape defining a longitudinal direction along which the friction means is movable.

9. An arrangement according to claim 7, wherein a first end portion is fixed at a first end of the support portion forming a shoulder for the spring means.

10. An arrangement according to claim 7, wherein a second end portion is fixed at a second end of the support portion forming a shoulder for the friction means.

11. An arrangement according to claim 7, wherein the support portion is formed by a bolt shank.

12. An arrangement according to claim 7, wherein the first pressure member is formed by a movable piston and the second pressure member is formed by a stationary piece.

13. An arrangement according to claim 12, wherein the friction means forms the friction joint with the piston.

14. An arrangement for reducing a rotational speed of a rotating member, comprising
a first and second pressure member arranged at a distance from each other and on opposite sides of the rotating member for movement relative to each other between a retracted position and a forward position engaging the rotating member, an adjustment device comprising
a friction means forming a friction joint with one of the pressure members for maintaining a position relative to one another provided a maximum friction force is not exceeded, and
a spring means acting on the friction means for separating the pressure members after having been compressed, the spring means having an increasing spring force between a non-compressed state and a totally compressed state
wherein an intermediate spring force value of the spring means, which corresponds to compression of the spring means to an extent less than the totally compressed state, equals a maximum friction force of the friction joint so that the friction means is forced to move relative to the pressure member, with which it forms the friction joint, due to compression of the spring means to the intermediate spring force value at which the maximum friction force is exceeded, the adjustment device comprises a support portion and the friction means is arranged for movement along the support portion, a first end portion is fixed at a first end of the support portion forming a shoulder for the spring means, and the first pressure part is formed by a movable piston and the second pressure part is formed by a stationary piece, the friction means forms the friction joint with the piston, and the first end portion of the support portion is supported by the stationary piece.

15. An arrangement for reducing a rotational speed of a rotating member, comprising
a first and second pressure member arranged at a distance from each other and on opposite sides of the rotating member for movement relative to each other between a retracted position and a forward position engaging the rotating member, an adjustment device comprising
a friction means forming a friction joint with one of the pressure members for maintaining a position relative to one another provided a maximum friction force is not exceeded, and
a spring means acting on the friction means for separating the pressure members after having been compressed, the spring means having an increasing spring force between a non-compressed state and a totally compressed state
wherein an intermediate spring force value of the spring means, which corresponds to compression of the spring means to an extent less than the totally compressed state, equals a maximum friction force of the friction joint so that the friction means is forced to move relative to the pressure member, with which it forms the friction joint, due to compression of the spring means to the intermediate spring force value at which the maximum friction force is exceeded, the adjustment device comprises a support portion and the friction means is arranged for movement along the support portion, the first pressure member is formed by a movable piston and the second pressure member is formed by a stationary piece, and the friction means forms the friction joint with the stationary piece.

16. An arrangement according to claim 9, wherein the first pressure part is formed by a movable piston and the second pressure part is formed by a stationary piece, the friction means forms the friction joint with the piston, and the first end portion of the support portion is supported by the piston.

17. An arrangement according to claim 1, wherein the intermediate spring force value is in the interval of 30-90% of the maximum spring force.

18. A brake comprising the arrangement according to claim 1.

19. A clutch comprising the arrangement according to claim 1.

* * * * *